(12) United States Patent
Britz et al.

(10) Patent No.: US 8,233,673 B2
(45) Date of Patent: Jul. 31, 2012

(54) METHOD AND APPARATUS FOR EYE-SCAN AUTHENTICATION USING A LIQUID LENS

(75) Inventors: David Britz, Rumson, NJ (US); Robert R. Miller, Convent Station, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 358 days.

(21) Appl. No.: 12/605,180

(22) Filed: Oct. 23, 2009

(65) Prior Publication Data

US 2011/0096960 A1    Apr. 28, 2011

(51) Int. Cl.
  *G06K 9/00* (2006.01)
(52) U.S. Cl. ............................................... 382/117
(58) Field of Classification Search .................. 382/115, 382/117–118, 124, 209, 218
  See application file for complete search history.

(56) References Cited

U.S. PATENT DOCUMENTS

| | | | |
|---|---|---|---|
| 5,359,669 A | 10/1994 | Shanley et al. | |
| 7,221,931 B2* | 5/2007 | Benco et al. | 455/410 |
| 7,768,380 B2* | 8/2010 | Breed et al. | 340/426.1 |
| 2006/0114170 A1 | 6/2006 | Sievenpiper | |
| 2008/0147409 A1* | 6/2008 | Taormina | 704/270.1 |
| 2008/0245872 A1* | 10/2008 | Good | 235/462.24 |
| 2009/0088203 A1 | 4/2009 | Havens et al. | |
| 2009/0163175 A1* | 6/2009 | Shi et al. | 455/411 |

FOREIGN PATENT DOCUMENTS

| | | |
|---|---|---|
| EP | 1 596 470 A1 | 11/2005 |
| EP | 1 816 491 A1 | 8/2007 |
| EP | 2 076 071 A1 | 1/2009 |
| WO | WO 00/31679 | 6/2000 |
| WO | WO 2006/023195 A2 | 3/2006 |
| WO | WO 2006/055798 A1 | 5/2006 |
| WO | WO 2007/0088453 A1 | 9/2007 |
| WO | WO 2008/121159 A2 | 10/2008 |

OTHER PUBLICATIONS

International Search Report and Written Opinion for PCT/US2010/053320, Jan. 27, 2011, consists of 12 unnumbered pages.
S. Kuiper et al., "Variable-focus liquid lens for miniature cameras," Applied Physics Letters, AIP, American Institute of Physics, vol. 85, No. 7, Jan. 1, 2004, pp. 1128-1130.
International Search Report and Written Opinion for PCT/US2010/053311, Jan. 13, 2011, consists of 12 unnumbered pages.

* cited by examiner

*Primary Examiner* — Daniel Mariam (57) ABSTRACT

A method and apparatus for providing eye-scan authentication using an adaptive liquid lens are disclosed. For example, in one embodiment, the method receives a request for eye-scan authentication from a mobile endpoint device of a user, wherein the request comprises a first retinal image of the user captured using an adaptive liquid lens of the mobile endpoint device. The method obtains a second retinal image of the user, wherein the second retinal image is a stored retinal image of the user. The method authenticates the first retinal image against the second retinal image. In another embodiment, the method captures a first retinal image of a user via a mobile endpoint device of the user, wherein the mobile endpoint device comprises an adaptive liquid lens. The method then sends a request for eye-scan authentication from the mobile endpoint device over a network, wherein the request comprises the first retinal image.

20 Claims, 5 Drawing Sheets

METHOD AND APPARATUS FOR EYE-SCAN AUTHENTICATION USING A LIQUID LENS

The present invention relates generally to authentication and, more particularly, to a method for eye-scan authentication using a liquid lens.

BACKGROUND OF THE INVENTION

The increasing utilization of remote access and broadband services has increased the need for security verification of users who use remote devices to access various services and/or to perform transactions. For example, a customer may access various multimedia services, perform banking transactions, make purchases, and so on, using a mobile device such as a laptop computer, a cell phone, a smart phone, and the like. A typical authentication method may simply use a password and a user login name. Unfortunately, passwords and user login names can be easily compromised for many reasons. For example, the user may keep a default password, or use an easily deducible name, birthday, etc.

Another approach for increasing security is to employ verification or authentication using biological markers such as fingerprints, and the like. Biological markers are less likely to be compromised. However, authentications based on biological markers are typically available only on fixed stations, e.g., security devices deployed near entry doors to highly secure areas.

SUMMARY OF THE INVENTION

In one embodiment, the present invention discloses a method and apparatus for providing eye-scan authentication using an adaptive liquid lens. For example, the method receives a request for eye-scan authentication from a mobile endpoint device of a user, wherein the request comprises a first retinal image of the user captured using an adaptive liquid lens of the mobile endpoint device. The method obtains a second retinal image of the user, wherein the second retinal image is a stored retinal image of the user. The method authenticates the first retinal image against the second retinal image.

In another embodiment, the method captures a first retinal image of a user via a mobile endpoint device of the user, wherein the mobile endpoint device comprises an adaptive liquid lens. The method then sends a request for eye-scan authentication from the mobile endpoint device over a network, wherein the request comprises the first retinal image.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for eye-scan authentication using a liquid lens, e.g., deployed on a mobile device that is capable of communicating with a network. In turn, the result of the authentication can be extended beyond the mobile device and into the network, e.g., the authentication can be used to access various services over the network. Although the present invention is discussed below in the context of wireless networks, e.g., cellular networks, the present invention is not so limited. Namely, the present invention can be applied to all networks that would benefit from authentication implemented on mobile devices, e.g., laptops, mobile phones, and the like.

Figure 1:
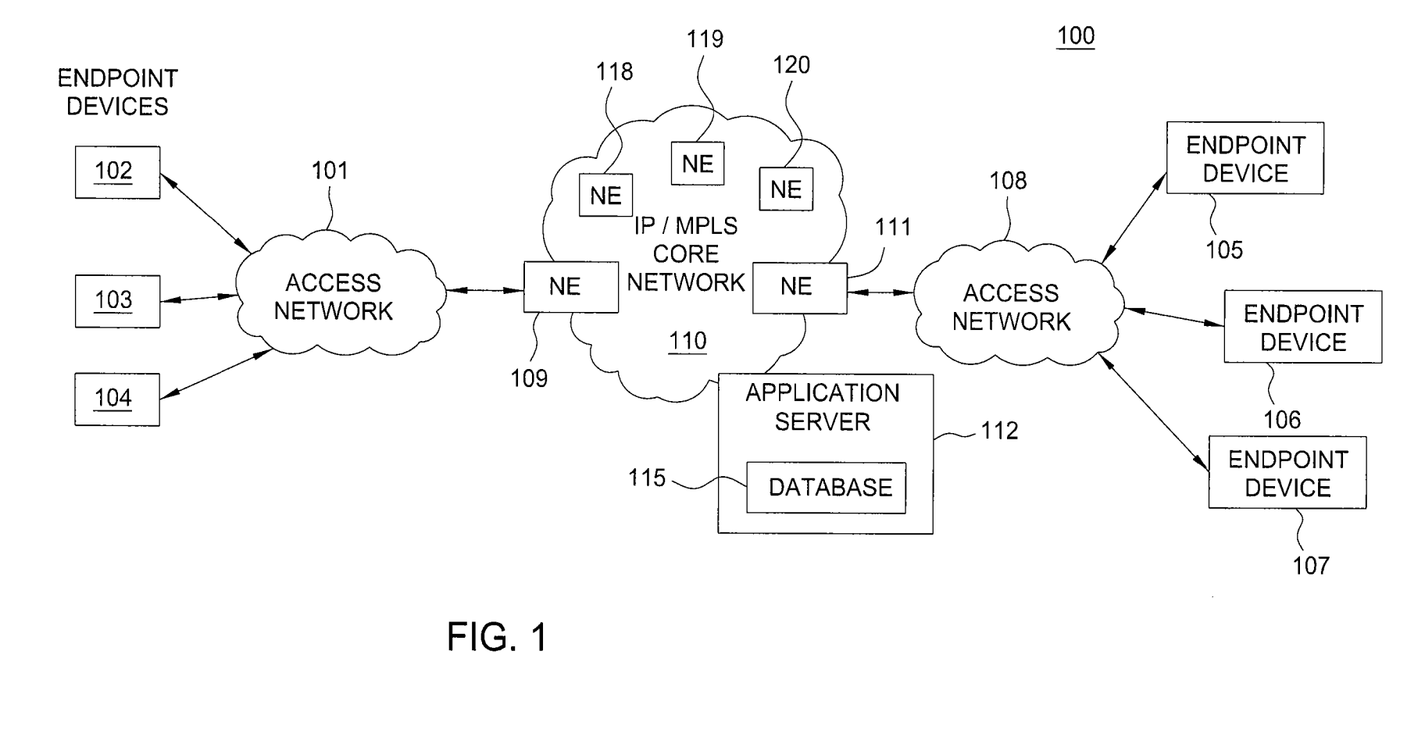
FIG. 1 illustrates an exemplary network related to the present invention.

FIG. 1 is a block diagram depicting an exemplary packet network 100 related to the current invention. Exemplary packet networks include Internet protocol (IP) networks, Internet Protocol (IP) Multimedia Subsystem (IMS) networks, Ethernet networks, and the like. An IP network is broadly defined as a network that uses Internet Protocol e.g., IPv4 or IPv6 and the like, to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, servers, routers, and the like. The access networks 101 and 108 serve as a conduit to establish a connection between the endpoint devices 102-107 and the NEs 109 and 111 of the core network 110, e.g., an IP/MPLS core network. The access networks 101 and 108 may each comprise a wireless network, a cellular network, a Digital Subscriber Line (DSL) network, a broadband cable access network, a Local Area Network (LAN), a Wireless Access Network (WAN), a 3$^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and one application server, are depicted in FIG. 1, the communication system 100 can be expanded by including any number of endpoint devices, access networks, network elements, and application servers without altering the scope of the present invention.

The above communication network is described to only provide an illustrative environment in which packets are transmitted on networks. In one embodiment, a service provider (or a third party merchant) may enable its customers to access services from remote or mobile locations. In turn, a customer may authenticate his/her identity using a mobile device. For example, a customer may access a network from a mobile location by entering a password along with a user identification (ID) such as a user login name. However, if the password and user ID are compromised, it may be used by another individual to gain unauthorized access or to make unauthorized purchases. Thus, the service provider may prefer a higher level of authentication such as using biological markers of the customers. For example, fingerprints and retinal scans may be used, which are not easily compromised. However, scanners of biological markers are typically mounted on fixed devices that are deployed locally at specific locations such as entry doors and the like.

However, images may be captured using mobile phones with Charge Coupled Device (CCD) or Complementary Metal Oxide Silicon (CMOS) technologies. CCD and CMOS are two popular types of image sensors for digital cameras. Similar to regular digital cameras, cell phones may be equipped with CCD or CMOS technologies with several megapixel resolutions, e.g., five megapixel resolutions. Currently, customers are accustomed to taking pictures using their cell phones and distributing the pictures to family and friends over a network such as the Internet.

In one embodiment, the current invention provides a method and apparatus for implementing eye-scan authentication using a liquid lens that is incorporated into a mobile device, e.g., a mobile phone. A liquid lens is a lens made from two liquids of equal density sandwiched between two windows in a conical vessel. For example, the liquids may be oil and water. It should be noted that other types of liquids in addition to water and oil can be used. If a voltage is applied across the conical structure, the shape of the interface between the oil and water changes. For example, if zero volts are applied, the shape of the interface will be flat, whereas if 40 volts are applied, the shape will be highly convex. The ability to manipulate the shape of the interface allows for electronic control of certain properties of the lens. For example, a far field imagine lens (a regular camera lens) can be changed to a near field imagine lens capable of taking microscopic type images which can be used for retinal scanning.

In addition, unlike a traditional microscopic lens, a liquid lens can be implemented with a very small physical footprint. For example, a liquid lens of a very small physical size can be implemented with a camera for thin profiled applications.

In one embodiment, the current method provides an eye-scan authentication using a liquid lens in a mobile device such as a mobile phone. That is, a customer's mobile phone is used as a portable eye scanner that is available to the customer at any time for authentication purposes.

For example, a service provider (or a third party, e.g., a merchant, or a credit card company) may store the customer's biometric data, e.g., retinal image of the customer, at a network location. When a customer accesses a service or makes a purchase, the customer may authenticate his/her identity by taking the customer's own retinal image using the mobile phone, optionally encrypting the image as needed, and transmitting the image to the service provider for authentication. For example, the customer places the mobile phone close to the customer's eye, to capture a close up image of the customer's retina. Effectively, the mobile phone is used to perform retinal scanning to capture the image of a user's retina. The captured image can then be encrypted and transmitted to the service provider for authenticating the customer's identity (or broadly the identity of the user operating the mobile device).

The service provider may then receive the transmitted image and compare the image to the customer's retinal image previously stored in a database. The customer can then be allowed to access the services or make purchases if the authentication based on the retinal image is successful.

Figure 2:
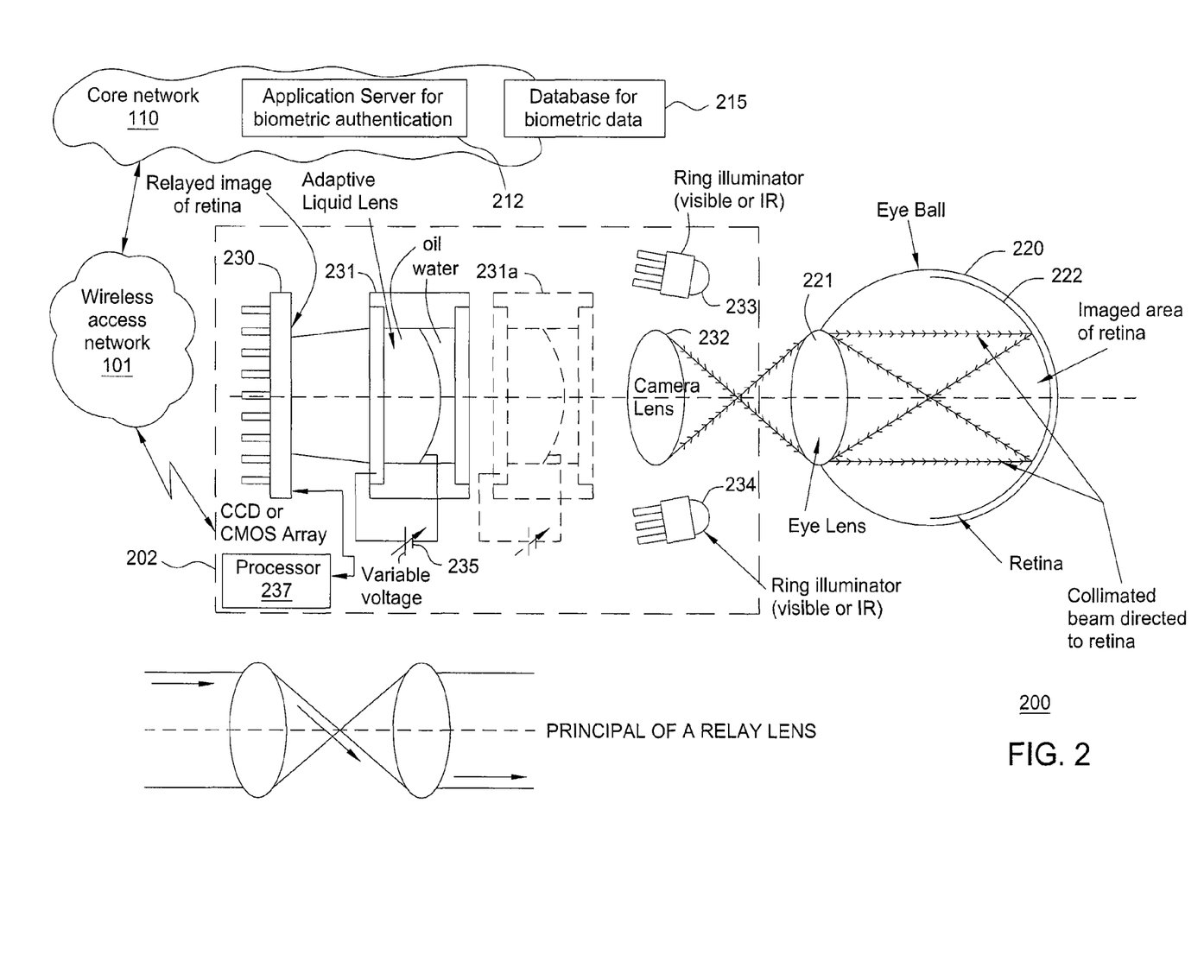
FIG. 2 illustrates an exemplary network with one embodiment of the present invention for eye-scan authentication using a liquid lens.

FIG. 2 illustrates an exemplary network 200 with one embodiment of the present invention for providing eye-scan authentication using a liquid lens. The exemplary network 200 comprises a mobile phone 202 (e.g., a cellular phone, a smart phone and the like) communicating with a core network 110 via a wireless access network 101. In one embodiment, the core network 110 comprises an application server 212 for providing eye scan authentication and a database 215 containing stored biometric data, e.g., retina images of a plurality of customers. The stored biometric data was previously obtained directly from the customers, e.g., when the customers subscribed to a service provided by the service provider. For example, at the point of sale or at the point of subscription, the customer can provide the biometric data.

In one embodiment, the mobile phone 202 is used to take one or more images of a retina 222, through an eye lens 221 in the eye ball 220. The mobile phone 202 may comprise a CCD or CMOS array 230, an adaptive liquid lens 231 (broadly a first optical stage), a fixed camera lens 232 (broadly a second optical stage), illuminators 233-234 (e.g., organized in a ring or substantially circular configuration), and a variable voltage source 235.

The CCD or CMOS array 230 is an image sensor used to convert light to electrons. For example, the light received through the lenses 232 and 231 converge onto the image sensor 230. The image sensor 230 converts the optical signal to an electronic (e.g., analog) signal and send it to a processor 237 which may then create a digital version of the captured image.

The above retina scanning requires illumination of the retina. However, the retina is highly reflective and the retinal scan requires suitable illumination. For example, the current method may use a beam splitter, e.g., a LED illuminator beam splitter mirror between the primary imaging lens and the exit aperture of the scanner housing, or one or more lighting elements around the lens for flooding the retina with light, through the iris and the eye lens.

More specifically, in one embodiment, the illuminators 233-234 are used to provide illumination to the retina 222. It should be noted that a customer may feel discomfort with the brightness of the light being used for illumination. However, the CCD and CMOS type imagers are sensitive to a wide range of wavelengths, including visible and near infrared wavelength. As such, the illuminators 233 and 234 illuminate or diffuse light in the visible or Infrared Radiation (IR) range. In one embodiment, the illuminators 233 and 234 are used to flood the retina with light through the iris and eye lens, thereby addressing a potential problem known as "red eye", which is the unintentional illumination of the retina by a bright camera flash. By using proper illumination via the illuminators 233 and 234, e.g., IR illumination or near IR illumination, the user will be relieved from the discomfort of dealing with a bright flash. In other words, in one embodiment, the current method uses infrared radiation for illumination such that the retinal scan can be performed without causing discomfort due to bright lights in the visible wavelength range.

The combination of the fixed camera lens 232 and the adaptive liquid lens 231 is used to take macroscopic images of the retina. That is, the combination of the fixed camera lens 232 and the liquid lens 231 functions as a macro lens for near field focusing. In one embodiment, the variable voltage source 235 is used to ensure the image is properly focused on the CCD or CMOS array 230. That is, the voltage source 235 is used for controlling the shape of the interface between the water and oil in the adaptive liquid lens 231, thereby controlling the focus of the retinal image onto the CCD or CMOS array 230. Namely, the reflected image of the retina returning back through the series of lens (i.e., the eye lens, the fixed camera lens, and the liquid lens) needs to be focused onto the CCD or CMOS array 230.

In one alternate embodiment, the two optical stage arrangement as discussed above is modified where the fixed camera lens is replaced with a second adaptive liquid lens (shown as 231a in phantom) that would function as the primary imaging lens. The use of two liquid lenses rather than one may allow for a greater adaptive focus control response and less severe liquid lens curvatures in either lens stage as the full macro lens optical power requirement is shared between the two liquid lens stages. This alternate embodiment will also require less electrical power and thus will prolong battery life. Furthermore, the increased focus flexibility would also allow for a broad focus range for imaging applications beyond retinal scanning.

As discussed above, in one embodiment, the retinal scanning is performed by the customer using the mobile phone equipped with a liquid lens capable of taking microscopic images. Since the object (i.e., the retina) is very close by (in near field), the muscular movement of the customer, while taking the image, may cause an image smear. In one embodiment, the current method uses one or more image stabilization techniques to avoid image smears. For example, the current method may perform image stabilization to compensate for the image shift induced by vibrations of the mobile phone. For example, the liquid lens can be used to shift the image across the imager's focal plane to compensate for the vibrations, e.g., caused by a shaking of the customer's hand. In another embodiment, the image shift at the focal plane due to hand vibrations could be captured and used along with edge detection techniques such as techniques used for image sharpening. It should be noted that any image stabilization techniques and/or edge detection techniques can be used with the present invention.

In one embodiment, the service provider implements an authentication method based on eye-scanning in an application server 212. For example, the retinal images taken by the mobile phone 202 are sent to the application server 212. The application server 212 may perform authentication of a customer by comparing a received image against a previously stored image in the database 215.

In one embodiment, when the customer accesses a service that requires eye-scan authentication, the customer may authenticate his/her identity by taking the customer's own retinal image using the mobile phone 202. The customer then transmits an authentication request to the application server 212 that comprises the retinal image. The application server 212 retrieves a previously stored retinal image for the customer from the database 215. If a retinal image is successfully located for the customer, the image received in the authentication request is then compared with the image retrieved from the database 215. If the images match, then the customer is then successfully authenticated. A response is then sent to the customer and the customer is then allowed to proceed with accessing a desired service.

Alternatively, the service provider may perform the authentication for a third party. For example, a mobile telephony service provider may perform an eye-scan authentication to certify to another third party that the user currently using the mobile phone is indeed a registered subscriber of the mobile telephony service provider. In doing so, an online merchant may then allow the user to make online purchases knowing that the identity of the user has already been certified by the mobile telephony service provider. To illustrate, a user who is a subscriber of a cellular service provided by a cellular service provider may want to make purchases using the user's cellular phone. Prior to accessing the website of a merchant, the user will forward a retinal image via the cellular phone to the cellular service provider who will authenticate the identity of the user. Once the user is authenticated, the cellular service provider can forward the user's authentication information (e.g., an electronic authentication certificate) to any online merchants that the user will be interacting with for the purpose of making purchases.

Alternatively, it should be noted that the authentication can be performed by a third party instead of the service provider. For example, the third party can be a credit card company that has issued a credit card to the user. In doing so, the credit card company may employ its own application server that contains stored biometric information pertaining to all the credit card holders. The credit card company can then perform eye-scan authentication before approving a transaction debited against a credit card issued by the credit card company.

Figure 3:
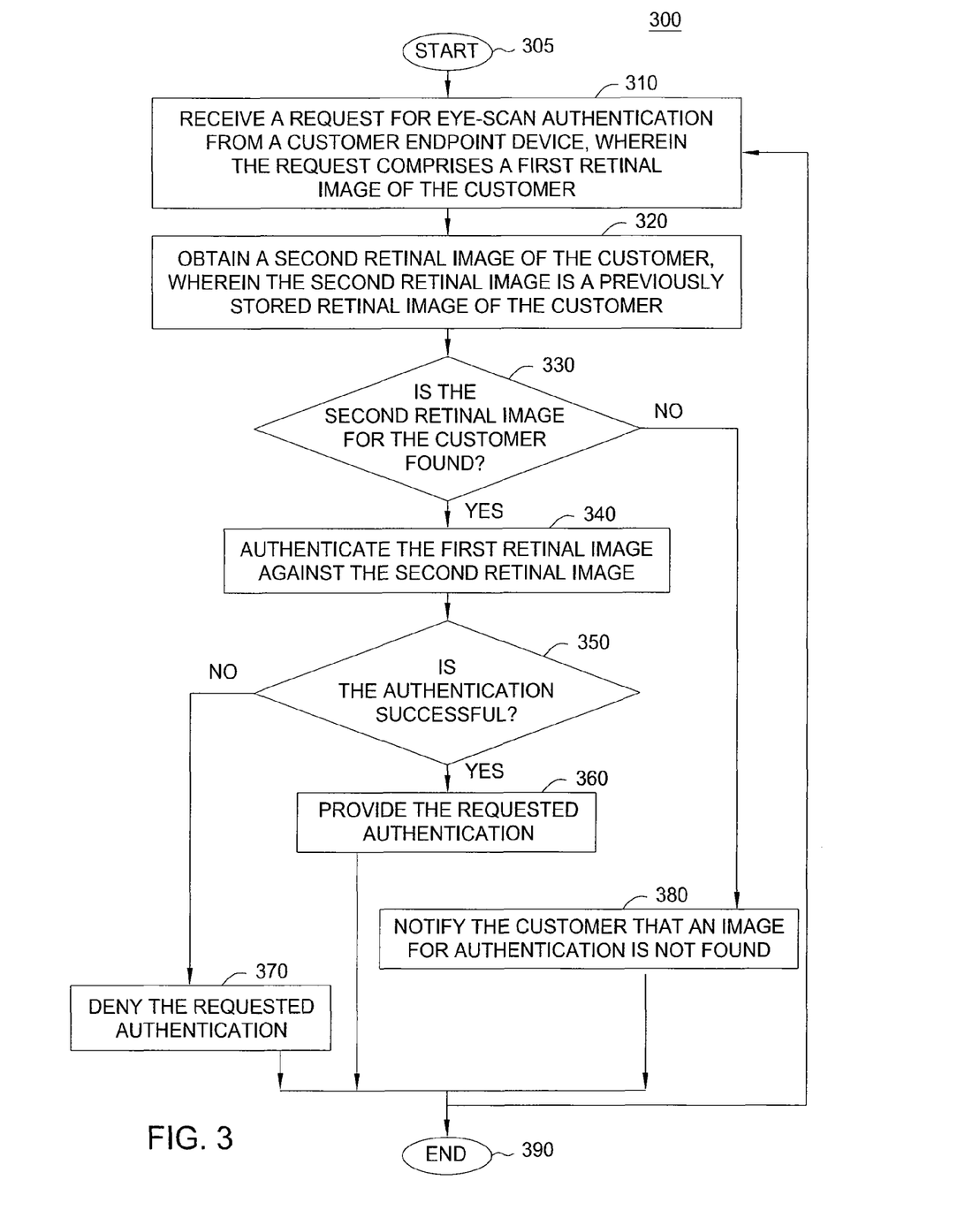
FIG. 3 illustrates a flowchart of a method for eye-scan authentication using a liquid lens.

FIG. 3 illustrates a flowchart of a method 300 for providing eye-scan authentication using a liquid lens. In one embodiment, one or more steps of method 300 can be implemented in an application server. Method 300 starts in step 305 and proceeds to step 310.

In step 310, method 300 receives a request for eye-scan authentication from a customer endpoint device (broadly from a user of a mobile endpoint device), wherein the request comprises a first retinal image of the customer. For example, the customer may be initiating a transaction that requires authentication of the identity of the customer. For example, the customer takes an image of his/her retina using a mobile phone equipped with an adaptive liquid lens for near field imaging. The customer then sends the retinal image in an authentication request.

In step 320, method 300 obtains a second retinal image of the customer, wherein the second retinal image is a previously stored retinal image of the customer. For example, the service provider has previously stored customer biometric data, including retinal images, in a database. The method may then retrieve the customer's retinal image previously stored in the database.

In step 330, method 300 determines if the second retinal image is found for the customer. If the second retinal image (e.g., a previously stored retinal image) for that customer is found, the method proceeds to step 340. Otherwise, method 300 proceeds to step 380.

In step 340, method 300 authenticates the first retinal image against the second retinal image. For example, the method compares the retinal image received in the authentication request with the previously stored retinal image obtained from the database in order to determine if the request is originated by the customer or another person using the endpoint device, e.g., the cell phone.

In step 350, method 300 determines if the authentication is successful. For example, the method may determine that the first and the second retinal images are images of the same eye. In another example, the method may determine that the first retinal image is not that of the customer. For example, the cell phone has been compromised and another person may be attempting to initiate an unauthorized transaction and/or communication with the application server. If the authentication is successful, the method proceeds to step 360. Otherwise, the method proceeds to step 370.

In step 360, method 300 provides the requested authentication (broadly a positive response indicating that the requested authentication has succeeded), e.g., a positive response indicative of a successful authentication, an electronic authentication certificate, a positive response to allow the user to access a requested service, a positive response to allow the user to perform a transaction, and the like. It should be noted that any format of providing the requested authentication is contemplated by the present invention. For example, the method enables the customer to access one or more services that can be accessed only upon a successful authentication of the identity of the customer. Alternatively, the authentication can be performed for another third party as discussed above, where the authentication information can further be forwarded to the third party. In yet another alternate embodiment, the authentication is performed by a third party as discussed above. The method then proceeds to step 390 to end processing the current request or returns to step 310 to receive another request.

In step 370, method 300 denies the requested authentication (broadly a negative response indicating that the requested authentication has failed). For example, the method prevents the individual from accessing services (or making purchases) that may be accessed only upon a successful authentication of the identity of the requestor. For example, another individual may be using the customer's cell phone and attempting to access unauthorized services. The method then proceeds to step 390 to end processing the current request or returns to step 310 to receive another request.

In step 380, method 300 notifies the customer that a stored image necessary for authentication is not found. For example, the customer may not have stored a retinal image when the customer activated the service. The customer is then notified that the authentication is not possible due to the lack of a previously stored retinal image. The method then proceeds to step 390 to end processing the current request or returns to step 310 to receive another request.

Figure 4:
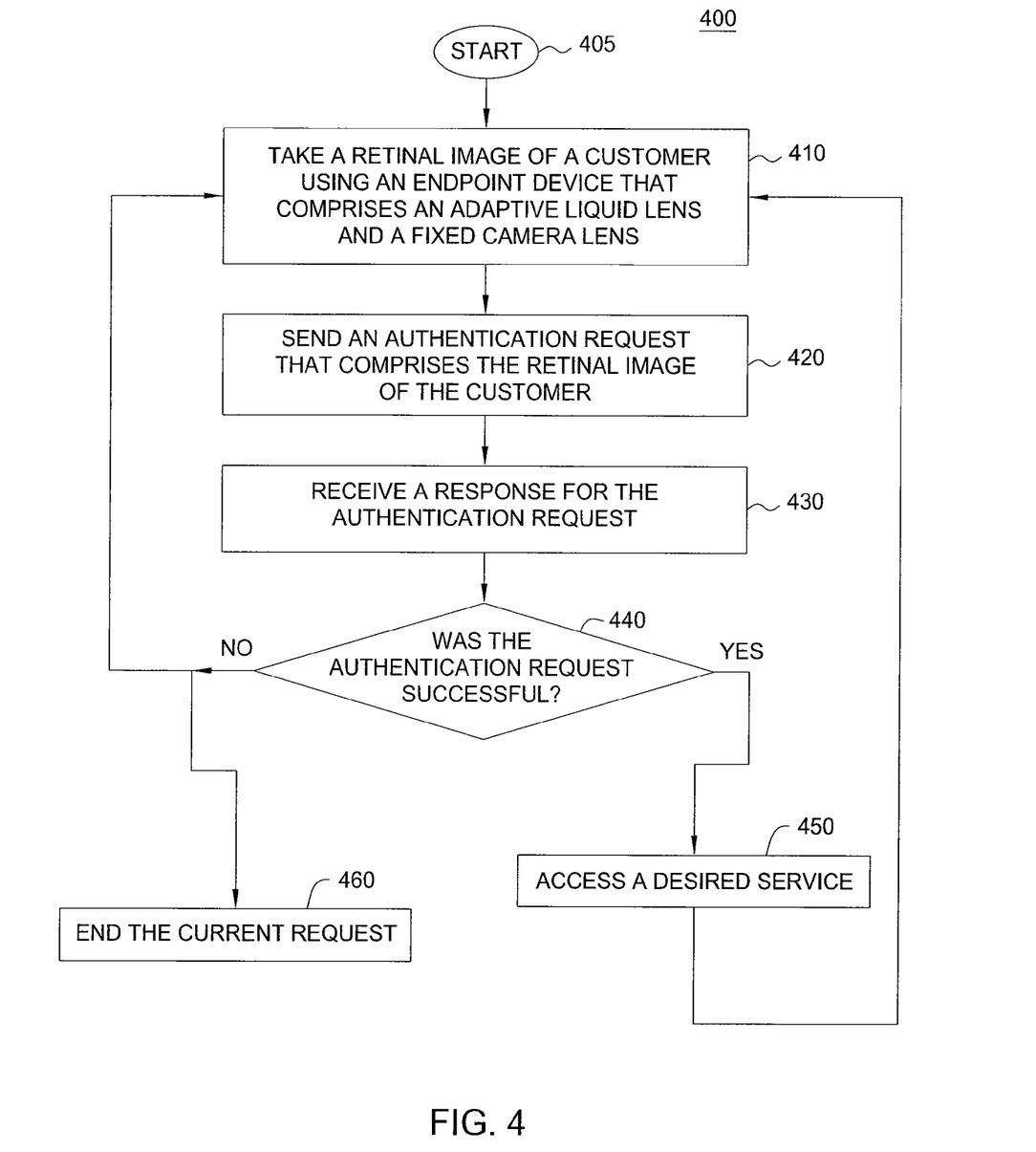
FIG. 4 illustrates a flowchart of a method for eye-scan authentication using a liquid lens in a customer endpoint device.

FIG. 4 illustrates a flowchart of a method 400 for eye-scan authentication using a liquid lens in a customer endpoint device. For example, one or more steps of method 400 can be implemented in a mobile endpoint device, e.g., a mobile phone. Method 400 starts in step 405 and proceeds to step 410.

In step 410, method 400 takes or captures a retinal image of a customer using a mobile endpoint device that comprises an adaptive liquid lens and a fixed camera lens, wherein the adaptive liquid lens and the fixed camera lens perform near field imaging. For example, the combination of the adaptive liquid lens and a fixed camera lens may function as a macro lens such that the combination can be used for close up images and accurate focusing of the resulting image on a CCD or CMOS array within the mobile endpoint device.

In step 420, method 400 sends an authentication request that comprises the retinal image of the customer (broadly a user of the mobile endpoint device). For example, the customer may send an authentication request to a network service provider that includes the retinal image taken by a mobile endpoint device, e.g., the cell phone as discussed above.

In step 430, method 400 receives a response for the authentication request. For example, the method may receive a response that indicates the retinal image successfully matched a previously stored retinal image of the customer.

In step 440, method 400 determines if the authentication request was successful. If the request is denied, the method proceeds to step 460 to end the current request or returns to step 410 to take another retinal image. For example, the captured image of the retina may be flawed for various reasons, e.g., the mobile endpoint device was misaligned with the user's eye, the image was slightly out of focus, the surrounding lightings caused unexpected distortions, and so on. Thus, the user may attempt to provide another image of the retina for authentication. If the request is successful, the method proceeds to step 450.

In step 450, the method accesses a desired service and returns to step 410, if it is sending another request. Alternatively, the method may perform a transaction such as making a purchase.

In one embodiment, the above method for eye-scan authentication can be adopted for authentication in other localized applications. For example, the authentication can be used to gain access to a local device. To illustrate, the retinal image of the customer can be stored locally within the mobile endpoint device, e.g., in the cell phone's memory, smart card, etc. The customer can then proceed with a transaction only after authenticating the identity of the user via a retinal scan, where the authentication is performed locally within the mobile endpoint device. Thus, a user is able to selectively implement various levels or varying degrees of security for the mobile endpoint device. Thus, a user may only implement the use of a simple password to use the mobile phone, but the user may require that a higher level of security for making purchases using the mobile phone. This approach allows the user to secure his or her mobile phone in the event of loss, without the inconvenience of having to provide biometric data for the simple use of the mobile endpoint device in making telephony calls. Hence, the ability to perform biometric authentication using a mobile endpoint device can be useful for various applications.

It should be noted that although not specifically specified, one or more steps of methods 300 and 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 and FIG. 4 that recite a determining operation or involve a decision, do not necessarily require that both branches of the determining operation be practiced. In other words, one of the branches of the determining operation can be deemed as an optional step.

In one embodiment, with the availability of dual-mode mobile phones (e.g., mobile phones that can utilize both cellular and Wi-Fi radio frequencies), the transfer of the captured retinal data between the mobile device and a receiver can be achieved via a direct peer to peer communication, e.g., via radio communication such as a Wi-Fi link and the like, or a physical cable, e.g., a Universal Serial Bus (USB) cable, a FireWire and the like. One advantage of direct peer to peer communication is the benefit of not having to access a large network, such a cellular network to transmit the captured retinal data. For example, a user may visit a local establishment such as a local bank or a local coffee house on a regular basis. The user can simply transmit the captured retinal data via direct peer to peer communication between the user's mobile device and a receiver deployed at the local establishment that has a server that has previously stored a copy of the user's captured retinal image. The local establishment can then perform retinal scan authentication locally without having to access any external network. This will increase the speed of authentication.

In one embodiment, the mobile endpoint device may employ a centering mechanism for providing a stable optical axis. For example, mechanical structures can be deployed to ensure precise alignment of all the lenses as discussed above. Any number of centering mechanisms can be used with the present invention, e.g., a marker located on the mobile device or dynamically generated by the mobile device that a user looks at when taking an image of the retina, a mechanical attachment (e.g., a funnel like structure) that a user couples to the mobile endpoint device, and so on.

In one embodiment, additional image processing can be employed. For example, image sharpening techniques could be employed automatically to sharpen, if necessary, the peripheral field of view of the relayed images of the retina's steeply curved surface onto the flat surface of the CMOS/CCD imager's surface.

It should be noted that the mobile endpoint device may comprise various user interfaces for facilitating eye-scan authentication. For example, a user interface may include a physical button or key on the mobile endpoint device for selecting a retinal scan feature. Alternatively, the mobile endpoint device may comprise a display where an icon representing eye-scan authentication is presented to the user. Once selected, the user will place the camera close to the user's eye and fixate the eye on the camera lens. In turn, a camera and illumination control system (e.g., a software and/or hardware system) will perform the necessary adjustments such as auto focus and any other image capturing adjustments. The camera may then perform the retina scan and capture the desired image.

Figure 5:
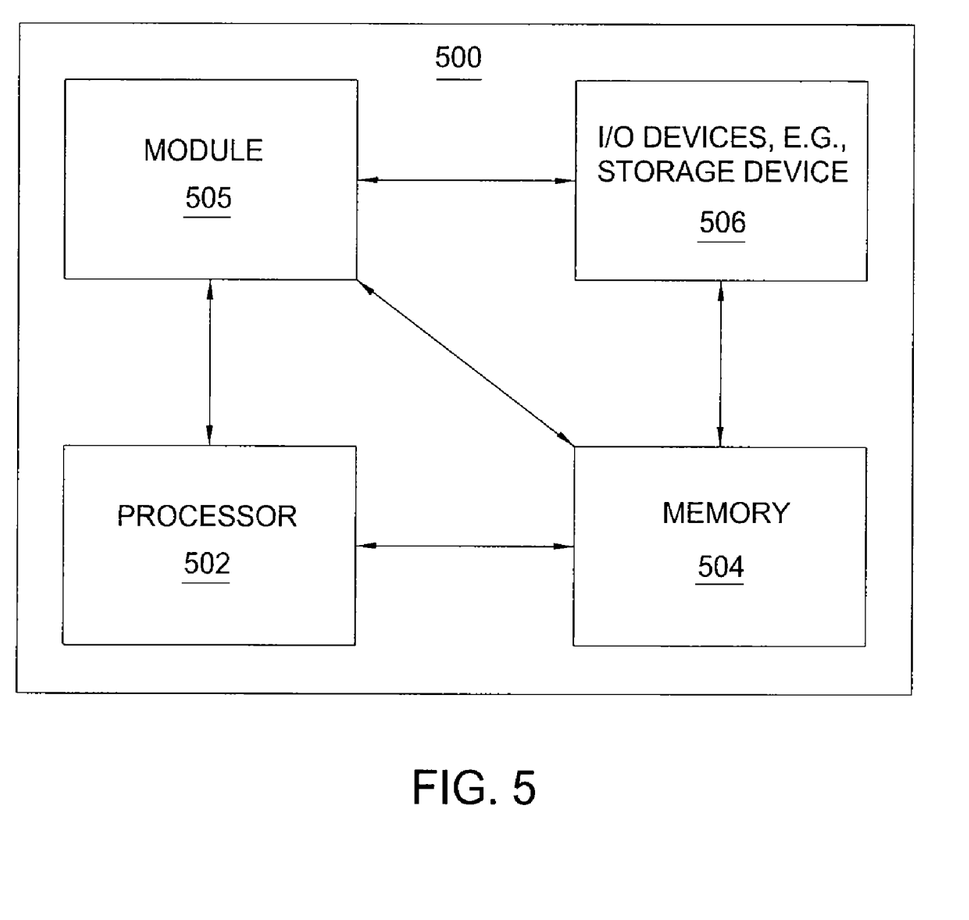
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing eye-scan authentication using a liquid lens, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for providing eye-scan authentication using a liquid lens can be loaded into memory 504 and executed by processor 502 to implement the functions as discussed above. As such, the present method 505 for providing eye-scan authentication using a liquid lens (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing authentication in a network, comprising:
  receiving a request for eye-scan authentication from a mobile endpoint device of a user, wherein the request comprises a first retinal image of the user captured using an adaptive liquid lens and a second lens of the mobile endpoint device, wherein the first retinal image of the user comprises a near-field image;
  obtaining a second retinal image of the user, wherein the second retinal image is a stored retinal image of the user; and
  authenticating the first retinal image against the second retinal image.

2. The method of claim 1, further comprising:
  providing a positive response to the mobile endpoint device if the request for eye-scan authentication is successful; and
  providing a negative response to the mobile endpoint device if the request for eye-scan authentication has failed.

3. The method of claim 1, wherein the second lens comprises a fixed camera lens, wherein the adaptive liquid lens and the fixed camera lens are used to perform near field imaging.

4. The method of claim 1, wherein the mobile endpoint device comprises a mobile phone.

5. The method of claim 4, wherein the user is a subscriber of a network service provided by a service provider of the network.

6. The method of claim 5, wherein the authenticating is performed by the service provider.

7. The method of claim 1, wherein the authenticating is performed by a third party.

8. The method of claim 1, wherein the mobile endpoint device uses infrared radiation for illumination of a retina of the user in capturing the first retinal image.

9. A method for providing authentication, comprising:
  capturing a first retinal image of a user via a mobile endpoint device of the user, wherein the mobile endpoint device comprises an adaptive liquid lens and a second lens, wherein the first retinal image of the user comprises a near-field image; and
  sending a request for eye-scan authentication from the mobile endpoint device over a network, wherein the request comprises the first retinal image.

10. The method of claim 9, further comprising:
  receiving a positive response over the network if the request for eye-scan authentication is successful; and
  receiving a negative response over the network if the request for eye-scan authentication has failed.

11. The method of claim 10, wherein the eye-scan authentication is performed by obtaining a second retinal image of the user, wherein the second retinal image is a stored retinal image of the user, and authenticating the first retinal image against the second retinal image.

12. The method of claim 9, wherein the second lens comprises a fixed camera lens, wherein the adaptive liquid lens and the fixed camera lens are used to perform near field imaging.

13. The method of claim 9, wherein the mobile endpoint device comprises a mobile phone.

14. The method of claim 13, wherein the user is a subscriber of a network service provided by a service provider of the network.

15. The method of claim 14, wherein the request for eye-scan authentication is processed by the service provider.

16. The method of claim 9, wherein the request for eye-scan authentication is processed by a third party.

17. The method of claim 9, wherein the mobile endpoint device uses infrared radiation for illumination of a retina of the user in capturing the first retinal image.

18. A non-transitory computer-readable storage medium having stored thereon a plurality of instructions, the plurality of instructions including instructions which, when executed by a processor, cause the processor to perform a method for providing authentication, comprising:

capturing a first retinal image of a user via a mobile endpoint device of the user, wherein the mobile endpoint device comprises an adaptive liquid lens and a second lens, wherein the first retinal image of the user comprises a near-field image; and     sending a request for eye-scan authentication from the mobile endpoint device over a network, wherein the request comprises the first retinal image.

19. The non-transitory computer-readable storage medium of claim 18, further comprising:

receiving a positive response over the network if the request for eye-scan authentication is successful; and     receiving a negative response over the network if the request for eye-scan authentication has failed.

20. The non-transitory computer-readable storage medium of claim 19, wherein the eye-scan authentication is performed by obtaining a second retinal image of the user, wherein the second retinal image is a stored retinal image of the user, and authenticating the first retinal image against the second retinal image.

\* \* \* \* \*